United States Patent [19]
Sugimura et al.

[11] 4,335,751
[45] Jun. 22, 1982

[54] ACCUMULATOR

[76] Inventors: Kazuo Sugimura; Nobuyuki Sugimura, both of 308, Mabase Shimizu-shi, Shizuoka-ken, Japan

[21] Appl. No.: 158,057

[22] Filed: Jun. 9, 1980

[30] Foreign Application Priority Data

Aug. 15, 1979 [JP] Japan ................................ 54-103711

[51] Int. Cl.$^3$ ................................ F16L 55/04
[52] U.S. Cl. ................................ 138/30; 138/44
[58] Field of Search ................................ 138/26, 30, 44; 137/517; 4/287, 295, 378, 379, 387

[56] References Cited

U.S. PATENT DOCUMENTS 3,540,482 11/1970 Fulme ................................ 138/30
4,020,872 5/1977 Sugimura et al. ................................ 138/30
4,252,151 2/1981 Haug et al. ................................ 138/30

*Primary Examiner*—James E. Bryant, III
*Attorney, Agent, or Firm*—Wegner, Stellman, McCord, Wood & Dalton

[57] ABSTRACT

A mushroom-shaped shield body, that is, a shield body having a configuration consisting of a back surface tapered section having its diameter successively increased towards the inside of an accumulator and a stem portion, is disposed coaxially at the inside end portion of a liquid feed/discharge port of the accumulator, and an inner surface tapered section is formed along the circumference of the liquid feed/discharge port opposed to the back surface tapered section of the shield body to form an annular liquid flow path between said back surface tapered section and said inner surface tapered section so that the direction of the liquid flow passing through this annular flow path may be directed along the inner wall surface of the vessel of the accumulator, whereby a diaphragm disposed within the accumulator can be deformed so as to conform to the inner wall surface of the vessel and thus the volume efficiency of the accumulator can be enhanced.

4 Claims, 8 Drawing Figures

ACCUMULATOR

Figure 1:
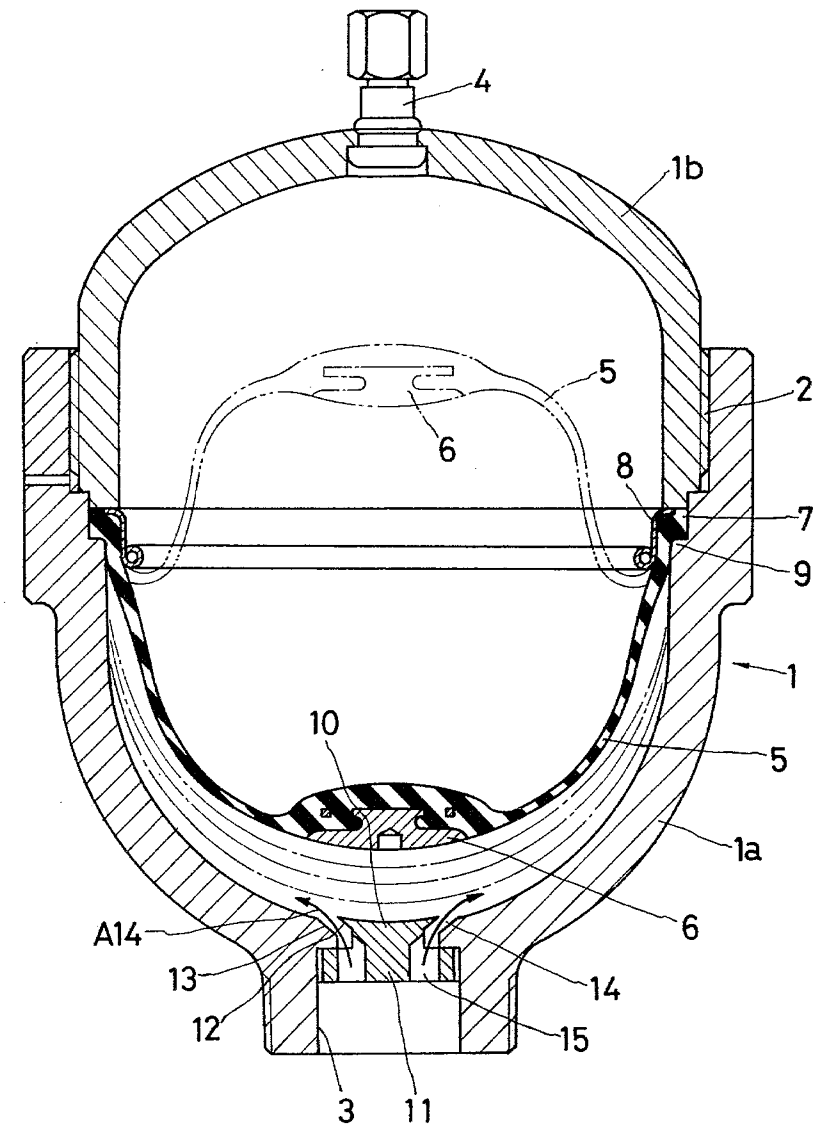

The present invention relates to improvements in an accumulator for a pressurized liquid.

In such type of accumulator, inherently the interior of a vessel main body is partitioned into a gas chamber and a liquid chamber by means of a diaphragm, bladder, or the like, and storage, shock absorption and the like of a pressurized liquid are effected while a preliminarily pressurized gas in the gas chamber is compressed by introducing a liquid into the liquid chamber. Hence it is an essential condition for enhancing a volume efficiency to approximate the volume of the diaphragm or bladder when the liquid has been discharged, to the inner volume of the vessel main body. For that purpose, upon discharging the liquid the diaphragm or the like must expand gradually in a cup shape from its mounting portion towards the bottom of the vessel while it is being brought into tight contact with the vessel main body, and finally it must extend in the axial direction so as to press a valve for opening and closing a liquid feed/discharge port with the bottom of the diaphragm and thus close the valve.

However, in the heretofore known accumulator having a liquid feed/discharge port opened towards the center of the bottom of the diaphragm, expansion of the diaphragm in the above-described manner can be effected only in the case where a discharge speed of the accumulated liquid is slow, and in the case where the discharge speed of the liquid is fast, the liquid feed/discharge port acts just as a jet nozzle resulting in a suction force exerted upon the bottom of the diaphragm. Consequently, the diaphragm extends in a cylindrical form in the axial direction without fully expanding in a cup shape, thus closes the valve with its bottom portion, and thereby prevents the accumulated liquid from discharging at the condition where the volume of the diaphragms largely differs from the inner volume of the vessel main body, so that a lot of liquid remains within the pressure vessel and thus the dischargeable amount is reduced. For instance, in the case where a liquid is stored together with a gas that has been preliminarily pressurized at 60 $Kg/cm^2$ in an accumulator having a nominal volume of 2 liters, at a final pressure of 120 $Kg/cm^2$, and the liquid is discharged at a flow velocity of 3.1 m/sec., then the diaphragm extends in the axial direction and closes the valve within only 0.146 seconds, thus only 610 $cm^3$ of the accumulated liquid can be discharged, and discharge of the liquid at a higher flow velocity than the above-mentioned value is impracticable. In addition, the liquid feed/discharge port acting as a jet nozzle, also applied an urging force concentrically to the center of the bottom of the diaphragm upon feeding a liquid to the accumulator if the flow velocity is high, so that the center of the bottom of the diaphragm is depressed towards the gas chamber and it is liable to cause the trend of preventing the liquid from uniformly flowing along the entire circumference of the diaphragm with the lower circumferential edge portion brought into tight contact with the vessel main body. Therefore, the diaphragm does not expand in the radial direction, and it merely undergoes abnormal deformation with its bottom portion projecting upwardly. Consequently, the amount of storage of the liquid is reduced, and hence in conjunction with the above-described trap effect for the liquid upon discharging, this greatly reduces the volume efficiency of the accumulator.

Furthermore, upon discharging of the liquid, if the diaphragm extends suddenly in a cylindrical form in the axial direction, the valve provided at the central portion of the diaphragm would impulsively close the liquid feed/discharge port, so that the valve and the opposing valve seat are apt to be damaged by the impact, and in some cases the central portion of the diaphragm or the like may be possibly pinched between the valve and the valve seat and thus broken. Also, upon contraction of the gas chamber above the diaphragm, if the diaphragm undergoes abnormal deformation with its central portion projecting upwardly, a bending force exceeding an elastic limit of the diaphragm would be locally exerted upon the diaphragm, resulting in break of the diaphragm.

Therefore, when the heretofore known common accumulators are used for high speed liquid feed or discharge, they have problems with respect to their volume efficiency and safety.

It is one object of the present invention to provide a novel accumulator, in which a lot of liquid does not remain within a pressure vessel even in the case where a flow velocity of a liquid flowing out through a liquid feed/discharge port of a vessel main body is high, and in which an amount of storage of a liquid within a vessel main body is not reduced even in the case where the liquid flows into the vessel at a high flow velocity.

Another object of the present invention is to provide a novel accumulator in which provision is made such that a liquid feed/discharge port of the accumulator may not be closed impulsively by a valve provided at a central portion of a diaphragm.

Yet another object of the present invention is to provide a novel accumulator in which provision is made such that a forcible bending force exceeding an elastic limit of a diaphragm may not be exerted locally upon the diaphragm upon its deformation.

The inventor of this invention conducted repeated research investigations to achieve these objects, and as a result, has reached the idea that if a mushroom-shaped shield body is provided at the inside end of a liquid feed/discharge port of a vessel main body to form an annular flow path therearound which directs a liquid flow so as to flow along the inner wall surface of the vessel main body, then even in the case of discharging the stored liquid from the vessel main body at a high velocity, a liquid flow directed in the axial direction of the vessel main body would not occur in the central portion due to the shielding of the feed/discharge port by the shield body, but instead a liquid flow following an annular flow path would occur in the portion along the inner wall surface of the vessel main body, and hence the diaphragm would gradually expand in a cup shape directed in the direction from its mounting portion towards the bottom of the vessel main body, with its peripheral surface being successively brought into tight contact with the vessel main body starting from its mounting portion, finally the center portion of the bottom of the cup-shaped diaphragm being brought into tight contact with the vessel main body, resulting in closure of the valve, so that the volume of the diaphragm upon discharging the liquid can be approximated to the inner volume of the vessel main body, whereby the volume efficiency of the accumulator can be enhanced up to its ideal value.

As a practical structure for realizing the above-mentioned novel idea, the inside end of the liquid feed/discharge port is shielded by providing a mushroom-shaped shield body at the inside end of the liquid feed/-discharge port, a back surface tapered section having its diameter succesively increased towards the liquid chamber, is formed on the backside of the shield body, and an inner surface tapered section is formed on the inner peripheral edge of the liquid feed/discharge port as opposed to the abovementioned back surface tapered section to provide an annular flow path between the respective tapered sections. Then, a liquid flow in the axial direction is not produced in the central portion of the vessel main body, but a liquid flow directed towards the aforementioned annular flow path arises in the portion along the inner wall surface of the vessel main body upon discharging the stored liquid, resulting in gradual expansion of the diaphragm in a cup shape from its mounting portion towards its bottom portion, and after termination of flow-out of the liquid, the valve is closed by the bottom portion of the diaphragm, whereby it has been successfully achieved to eliminate trapping of the stored liquid in the vessel main body.

More particularly, according to one feature of the present invention, a mushroom-shaped shield body is fixedly mounted at the inside end of the liquid feed/discharge port of the vessel main body to thereby intercept a liquid flow in the axial direction flowing directly towards the liquid feed/discharge port and to prevent the aforementioned jet nozzle effect of the liquid feed/-discharge port, a back surface tapered section and an inner surface tapered section each having its diameter successively increased towards the liquid chamber, are formed respectively on the backside of the shield body and on the inner peripheral edge of the feed/discharge port as opposed to each other to form an annular flow path between the respective tapered sections for directing a liquid flow along the inner wall surface of the vessel main body, thereby the diaphragm is made to gradually expand in a cup shape from its mounting portion towards its bottom portion, and after the stored liquid has been almost discharged, the bottom portion of the diaphragm is brought into contact with the vessel main body to close the feed/discharge port, whereby the volume of the gas chamber when the liquid has been discharged can be approximated to the inner volume of the pressure vessel. Also, according to the same feature of the present invention, upon feeding a liquid into the vessel main body, owing to the directing effect by the annular flow path for the liquid, the liquid is made to flow into the vessel along the inner wall surface of the vessel main body, so that the liquid pressure is exerted over the entire surface of the diaphragm and the volume of the gas chamber is reduced to its intended final volume while maintaining the shape of the diaphragm analogous to the shape of the upper wall of the vessel main body, and therefore, the intended volume of storage of the liquid can be realized and thus the volume efficiency of the accumulator can be enhanced up to its ideal value. Moreover, since the closure of the valve by means of the diaphragm is effected after the liquid has been discharged, the closing operation of the valve is carried out moderately without applying an impact to the valve and the valve seat nor without the diaphragm projecting and being pinched between the valve and the valve seat, and hence the valve, valve seat and diaphragm would not be damaged.

According to another feature of the present invention, guide blades are disposed in a radial arrangement within the annular flow path formed between the tapered section on the shield body side and the tapered section on the liquid feed/discharge port side, which are opposed to each other in a parallel relation, so that the flow of liquid radiated from the feed/discharge port into the vessel main body can be guided by these guide blades. Owing to such a structural feature, the radial flow of liquid can be fed evenly into the entire volume within the vessel main body, every portion of the diaphragm can be pressurized uniformly, so that the diaphragm can be regularly deformed while maintaining a configuration that is nearly analogous to the original configuration of the diaphragm to achieve the volume change of the liquid chamber efficiently, and also upon deformation of the diaphragm, forcible bending which causes damages can be avoided in any portion of the diaphragm, whereby damage of the diaphragm can be prevented.

Since the above-mentioned guide blades can maintain a fixed gap distance in the annular flow path between the respective tapered sections, can prevent a choke effect of the valve for the liquid flow and thereby makes it possible to discharge the liquid always at a fixed rate in a stable manner, the present invention can greatly contribute to enhancement of a volume efficiency of an accumulator.

In contrast to the prior art accumulator having a nominal volume of 2 liters as described previously, in the case where a liquid is stored together with a gas that has been preliminarily pressurized at 60 $Kg/cm^2$ in an accumulator embodying the present invention and having a nominal volume of 2 liters, at a final pressure of 120 $Kg/cm^2$, and the liquid is discharged at a flow velocity of 9.6 m/sec, the liquid accumulated within the vessel main body can be discharged within 0.05 seconds, this discharge speed being 2.9 times as high as the discharge speed of the prior art accumulator as described previously, the total amount of the discharged liquid amounts to 850 $cm^3$, and thus remarkable enhancement of a volume efficiency has been proved.

Figure 5:
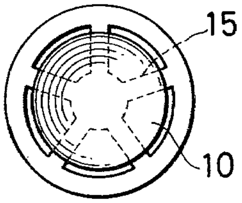
Figure 2:
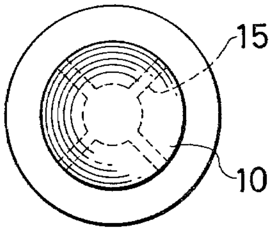
Figure 6:
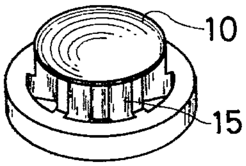
Figure 3:
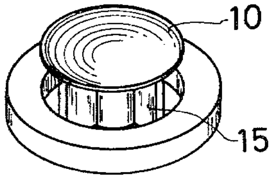
Figure 7:
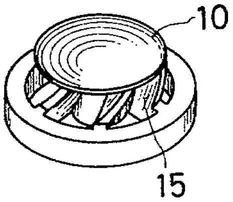
Figure 4:
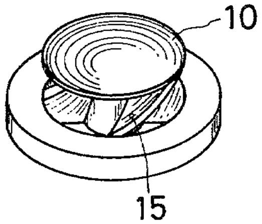
Figure 8:
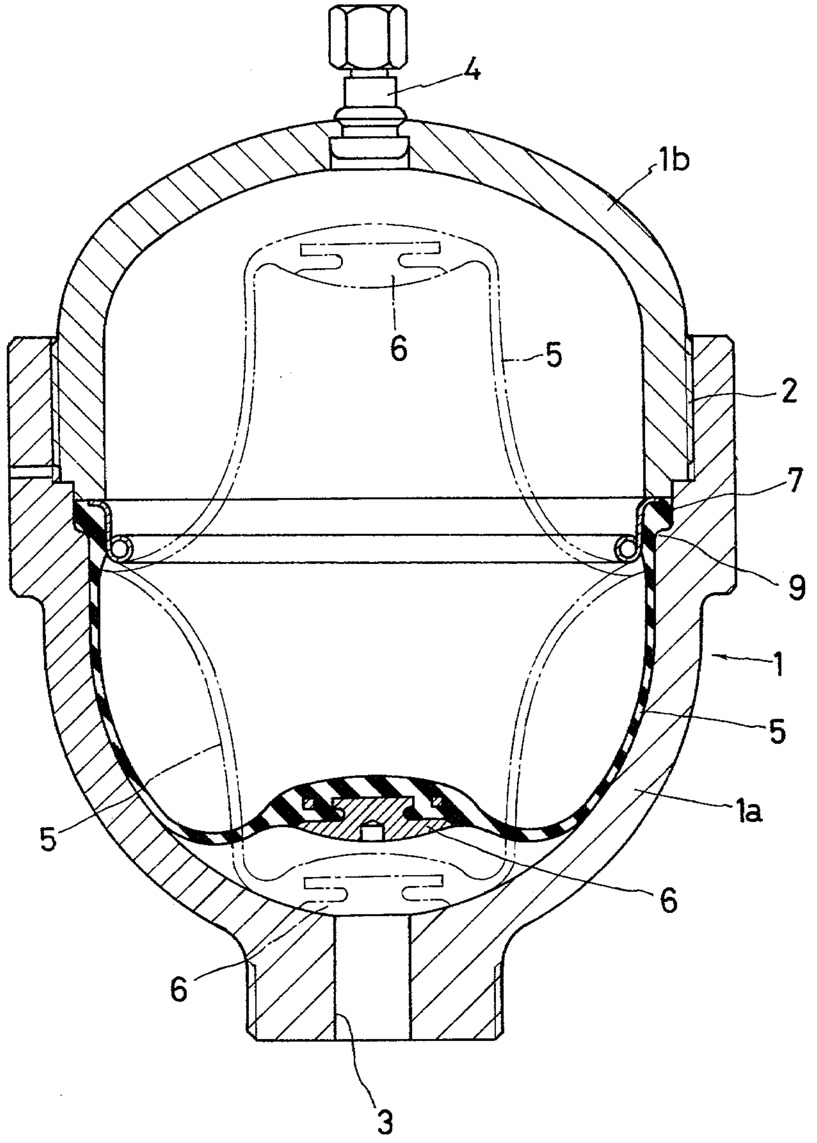
FIG. 8 PRIOR ART

The above-mentioned and other features and objects of the present invention will become more apparent by reference to the following description of its preferred embodiments taken in conjunction with the accompanying drawings, in which:

FIG. 1 is a longitudinal cross-section view of an accumulator according to the present invention, FIG. 2 is a plan view of a part of the accumulator shown in FIG. 1, FIG. 3 is a perspective view of the same part, FIG. 4 is a perspective view of a part corresponding to that shown in FIG. 3 in another preferred embodiment of the present invention, FIG. 5 is a plan view of a part corresponding to that shown in FIG. 2 in still another preferred embodiment of the present invention, FIG. 6 is a perspective of the part shown in FIG. 5, FIG. 7 is a perspective view of a part corresponding to that shown in FIG. 6 in yet another preferred embodiment of the present invention, and FIG. 8 is a longitudinal cross-section view of an accumulator in the prior art.

Referring now to FIG. 1 of the drawings, reference numeral (1) designates a vessel main body of an accumulator, in which a lower cup-shaped body (1*a*) and an upper cup-shaped body (1*b*), each being formed in a pressure-resistive structure by making use of steel or other appropriate materials depending upon the pressure to be used, are integrally coupled by screw threads (2), a liquid feed/discharge port (3) is provided at the center of the bottom of the lower cup-shaped body (1*a*), and a gas feed member (4) is mounted at the center of the top of the upper cup-shaped body (1*b*). Reference numeral (5) designates a diaphragm which is made of natural rubber, synthetic rubber, etc. and is formed into a cup shape conformed to the lower cup-shaped body (1*a*). At the center of the bottom of the diaphragm (5) is mounted a valve (6) which is adapted to be brought into tight contact with the inner bottom surface of the vessel main body (1) to shield the inside end of the liquid feed/discharge port (3). A mounting flange (7) is provided along the upper peripheral edge of the diaphragm (5), the lower edge of the flange (7) is supported by a stepped portion (9) of the lower cup-shaped body (1*a*), a junk ring (8) is fitted to the inside of the flange (7), the flange (7) is rigidly and air-tightly mounted to the vessel main body (1) by pressing this junk ring (8) with the upper cup-shaped body (1*b*), and thereby the interior of the vessel main body (1) is partitioned into a gas chamber and a liquid chamber.

Reference numeral (10) designates a mushroom-shaped shield body mounted to the inside of the liquid feed/discharge port (3) so as to shield the inside end of the feed/discharge port (3), which has its stem portion (11) held at the center of the liquid feed/discharge port (3) via guide blades (15) as will be described later. Reference numeral (12) designates a back surface tapered section provided along the back surface circumference of the mushroom-shaped shield body (10), which is inclined towards the center of the liquid feed/discharge port (3) at an inclination angle of 20° to 60° with respect to the horizontal plane. Reference numeral (13) designates an inner surface tapered section provided along the inner circumferential edge of the liquid feed/discharge port (3) in parallel to the back surface tapered section (12) to form an annular flow path (14) between the inner surface tapered section (13) and the aforementioned back surface tapered section (12) for directing the liquid flow so as to flow along the inner wall surface of the vessel main body. A number of guide blades (15) are disposed within this annular flow path (14) in a radial arrangement so that the radial flow of the liquid radiated into the vessel main body (1) may be guided by these guide blades (15). These guide blades (15) are provided four as extended over the back surface of the mushroom-shaped shield body (10) and its stem portion (11) as shown in FIGS. 2 to 4, either in an upright attitude as shown in FIG. 3 or in a twisted attitude as shown in FIG. 4, or else they are provided five as shown in FIGS. 5 to 7, either in an upright attitude as shown in FIG. 6 or in a twisted attitude as shown in FIG. 7.

Since the accumulator according to the present invention which has been improved in the liquid feed/discharge means is constructed as described above, if a pressurized liquid is fed through the liquid feed/discharge port (3) into the accumulater under the condition where the diaphragm (5) is expanded in a cup shape so as to be brought into tight contact with the lower cup-shaped body (1*a*) while it is pressed by a preliminarily pressurized gas, then a flow of the pressurized liquid in the axial direction is shielded by the shield body (10) disposed at the inside end of the liquid feed/discharge port (3), but as an annular flow path (14) is formed between the back surface tapered section (12) and the inner surface tapered section (13), the pressurized liquid flows into this annular flow path (14). Accordingly, the liquid flow is directed by the flow path (14) so as to flow along the inner wall surface of the vessel main body (1) in the direction represented by arrow (A14), and also a radial flow is induced by the guide blades (15) disposed in a radial arrangement within the flow path (14). Hence the liquid flows uniformly into the whole space within the vessel main body (1), and flows along the inner wall surface within the vessel main body (1) to the bottom peripheral edge of the diaphragm (5) and its mounting portion. Consequently, the diaphragm (5) is subjected to the liquid pressure over its entire peripheral surface except for its bottom portion, so that it continues to contract as shown by solid lines in FIG. 1 while maintaining the shapes analogous to its original shape as shown by single-dot chain lines in the same figure, the cup shape of the diaphragm (5) becomes gradually shallow, eventually the cup shape is reversed as shown by double-dot chain lines in the same figure, and thus the accumulator can accommodate the pressurized liquid with its liquid chamber expanded up to the maximum volume. Then, since any forcible bending force which causes damage of the diaphragm (5) is not exerted upon any portion of the diaphragm (5) which is subjected to a pressing force uniformly over its entire peripheral portion, it is possible to safely accumulate a rated amount of pressurized liquid.

Also, when the accumulated pressurized liquid is discharged, since the liquid feed/discharge port (3) is shielded by the shield body (10), a liquid flow in the axial direction directed towards the liquid feed/discharge port (3) is not produced in the central portion of the vessel main body opposed to the bottom of the diaphragm (5), but a liquid flow in the opposite direction to that represented by arrow (A14) directed towards the annular flow path (14) occurs along the inner wall surface of the vessel main body (1). Therefore, the diaphragm (5) is restored successively to its original shape starting from the portion near to its mounting portion and recovers the state shown by solid lines in FIG. 1. Still further, after the liquid within the vessel main body (1) has been almost discharged while maintaining the shapes analogous to its original shape as show by single-dot chain lines in FIG. 1, the valve (6) mounted to the bottom portion of the diaphragm (5) rides on the liquid feed/discharge port (3) of the vessel main body (1), resulting in closure of the feed/discharge port (3). Consequently, the accumulated liquid can be entirely discharged and utilized effectively. Thus as a result of the increase of the amount of accumulation of a liquid, the volume efficiency of the accumulator can be increased up to the possible maximum limit. In addition, in the above-described accumulator according to the present invention, since the valve (6) moderately closes the liquid feed/discharge port after the accumulated liquid has been discharged, the closure of the valve is not accompanied by impacts, and hence there would not occur any damage of the valve nor the valve seat, nor pinching of a projected portion of the diaphragm (5) between the valve (6) and the valve seat which also causes damage of the diaphragm (5). Therefore, the novel accumulator can be used over a long period without any fault.

In contrast to the above-described novel accumulator according to the present invention, in the heretofore known accumulator as shown in FIG. 8, since the mushroom-shaped shield body is not provided at the inside end of the liquid feed/discharge port (3), if the accumulated liquid is discharge quickly through the feed/discharge port (3), then the diaphragm (5) does not deform while maintaining its original shape as shown in FIG. 1, but it extends downwardly in a cylindrical form as shown by single-dot chain lines in FIG. 8, resulting in closure of the feed/discharge port (3) with the valve (6), so that a large amount of liquid remains within the vessel main body (1).

On the other hand, in the case where a liquid flows quickly into the liquid chamber of the accumulator through the feed/discharge port (3), then the diaphragm (5) extends upwardly towards the gas chamber in a cylindrical form as shown by double-dot chain lines in FIG. 8, resulting in reduction of the amount of accumulation of a liquid. As a result of the reduction of the accumulation amount and the above-described increase of the amount of the retained liquid in combination, the volume efficiency of the accumulator is lowered. It is to be noted that in FIG. 8, component parts equivalent to those shown in FIG. 1 are given like reference numerals.

What is claimed is:

1. An accumulator in which an interior of a vessel main body is partitioned into a gas chamber and a liquid chamber by means of a diaphragm made of an elastic material such as rubber and a liquid feed/discharge port is provided at an end portion of said liquid chamber, characterized in that a mushroom-shaped shield body is disposed coaxially at the inside end portion of said liquid feed/discharge port, a back surface tapered section having its diameter successively increased towards said liquid chamber is formed on the backside of said shield body, an inner surface tapered section having its diameter successively increased towards said liquid chamber is formed along the circumference of the liquid feed/discharge port in said vessel main body to provide an annular flow path between said back surface tapered section and said inner surface tapered section, a plurality of guide blades are disposed within said annular flow path and are provided integrally with the back surface tapered section of said mushroom-shaped shield body.

2. An accumulator as claimed in claim 1, characterized in that said mushroom-shaped shield body has a stem portion and said guide blades are provided in a radial arrangement extending over the back surface tapered section and the stem portion.

3. An accumulator as claimed in claim 2, characterized in that said guide blades are formed in a spiral configuration.

4. An accumulator as claimed in claim 1, characterized in that a valve is provided at the bottom end of said diaphragm, and the configuration of the liquid chamber side end surface of said shield body is adapted to the configuration of said valve.

* * * * *